US011950548B2

(12) United States Patent
de Wet (10) Patent No.: US 11,950,548 B2
(45) Date of Patent: Apr. 9, 2024

(54) GROWTH ENHANCEMENT USING SCALAR EFFECTS AND LIGHT FREQUENCY MANIPULATION

(71) Applicant: RPD IP Holdings, LLC, Alpharetta, GA (US)

(72) Inventor: Riccardo A. de Wet, Alpharetta, GA (US)

(73) Assignee: ATIRA SOLUTIONS, LLC, Marietta, GA (US)

( * ) Notice: Subject to any disclaimer, the term of this patent is extended or adjusted under 35 U.S.C. 154(b) by 478 days.

(21) Appl. No.: 17/414,943

(22) PCT Filed: Oct. 17, 2019

(86) PCT No.: PCT/US2019/056760
§ 371 (c)(1),
(2) Date: Jun. 16, 2021

(87) PCT Pub. No.: WO2020/081828
PCT Pub. Date: Apr. 23, 2020

(65) Prior Publication Data
US 2022/0053707 A1 Feb. 24, 2022

Related U.S. Application Data

(60) Provisional application No. 62/747,083, filed on Oct. 17, 2018, provisional application No. 62/747,072, filed on Oct. 17, 2018.

(51) Int. Cl.
*A01G 7/04* (2006.01)
*F21V 9/40* (2018.01)
(Continued)

(52) U.S. Cl.
CPC .............. *A01G 7/045* (2013.01); *A01G 7/04* (2013.01); *F21V 9/40* (2018.02); *F21V 17/002* (2013.01);
(Continued)

(58) Field of Classification Search
CPC .. A01G 7/045; A01G 7/04; F21V 9/40; F21V 17/002; F21V 23/003; F21Y 2115/30; F21Y 2115/10
See application file for complete search history.

(56) References Cited

U.S. PATENT DOCUMENTS 9,622,424 B2 * 4/2017 Martin .................. A01G 7/045
10,433,493 B2 * 10/2019 Barber, III ................ G01J 1/20
(Continued)

FOREIGN PATENT DOCUMENTS

| CA | 2375695 | 9/2003 |
| KR | 1020140011732 | 1/2014 |
| WO | WO2018095850 | 5/2018 |

OTHER PUBLICATIONS

"PCT International Search Report and Written Opinion", PCT/US19/56760, dated Jan. 16, 2020.
(Continued)

*Primary Examiner* — Monica L Perry
*Assistant Examiner* — Aaron M Rodziwicz
(74) *Attorney, Agent, or Firm* — Clayton, McKay & Bailey, PC (57) ABSTRACT

Systems and methods herein improve plant growth through a combination of monochromatic laser light and Emerson effect enhancement. A microcontroller can change the frequency of a laser module and an LED array to enhance growth. For example, 663 nm can be used as an energy pump, and a phytochrome effect can be applied at 730 nm during flowering to extend the amount of time a flowering (Continued)

plant can handle light. A racking system can accept slidable LED lights for easy positioning. Additionally, a controller can use one or more scalar wave guides for channeling scalar energy. These can be active or passive. In one example, a controller causes the scalar wave guide to create an electromagnetic cancelation field whereby the device harnesses the fundamental earth Shuman resonance of 7.83 Hz and amplifies it to create anions in a predominantly cation rich environment.

20 Claims, 9 Drawing Sheets

(51) Int. Cl.
*F21V 17/00* (2006.01)
*F21V 23/00* (2015.01)
*F21Y 115/10* (2016.01)
*F21Y 115/30* (2016.01)

(52) U.S. Cl.
CPC ......... *F21V 23/003* (2013.01); *F21Y 2115/10* (2016.08); *F21Y 2115/30* (2016.08)

(56) References Cited

U.S. PATENT DOCUMENTS

| | | | |
|---|---|---|---|
| 11,337,376 B2* | 5/2022 | Zhao | A01G 9/023 |
| 11,375,595 B2* | 6/2022 | Barber | G01J 1/42 |
| 11,483,981 B1* | 11/2022 | Lo | A01G 31/06 |
| 2018/0054975 A1* | 3/2018 | Shur | G01J 3/42 |
| 2020/0068810 A1* | 3/2020 | Pahlevaninezhad | A01G 9/249 |
| 2020/0107504 A1* | 4/2020 | Bongartz | A01G 7/045 |

OTHER PUBLICATIONS

"Phytochrome", Missouri Botanical Garden, article (online), Aug. 3, 2013 (retrieved Dec. 19, 2019) Retrieved from the internet <URL: https://www.mobot.org/wcross/duckweed/phytochrome.htm> see entire document.

* cited by examiner

GROWTH ENHANCEMENT USING SCALAR EFFECTS AND LIGHT FREQUENCY MANIPULATION

CROSS-REFERENCE TO RELATED APPLICATIONS

This non-provisional application claims priority to provisional application No. 62/747,072, titled "Growth Enhancement Using Scalar Effects," filed Oct. 17, 2018, and incorporates that application by reference in its entirety. This non-provisional application also claims priority to provisional application No. 62/747,083, titled "Plant Growth Enhancement Using Laser and LED Frequency Manipulation," filed Oct. 17, 2018, and incorporates that application by reference in its entirety.

BACKGROUND

People have been growing plants for a variety of purposes for thousands of years. Many techniques have been employed to enhance growth rates, flowering, and crop production. This has included regulation of nutrients provided to the plants, $CO_2$, light, temperature, and a host of other environmental variables. With lighting in particular, existing systems can include overhead lights that emit frequencies known to be conducive to plant growth.

Typical grow light fixtures use high intensity discharge (HID) lamps, which can be costly to manufacture and operate. For example, many HID grow lamps cost thousands of dollars, may consume on the order of 400-1000 watts of electricity, and often produce excessive amounts of heat and noise.

U.S. Pat. No. 6,921,182 to Anderson, Jr., et al. discloses an LED lamp for enhancing commercial and home plant growth, including a first set of orange LEDs with a peak wavelength emission of about 612 nanometers, a second set of red-light emitting LEDs with a peak wavelength of about 660 nanometers, and blue light LEDs. Two beam spreads, 15 degrees and 30 degrees, were provided for both the 660 nm LEDs and 612 nm LEDs. When directed perpendicularly upon tops of the plant leaves, 10% light transmission occurred through the leaves for the 30-degree LEDs, and 80% light transmission for the 15-degree LEDs. Thus, Anderson reports that fully 50% of the orange/red spectrum primarily used for photosynthesis was transmitted through the upper leaf canopy, making it available to support photosynthesis in leaves below. Anderson describes positioning LED lamps at varying distances from the growing plants for controlling plant growth rates that vary with these distances, thereby to control plant inventory, because growth of plants can be greatly slowed to preserve them during periods of slow sales.

U.S. Patent Application 20040264195 by Chang et al. describes a light emitting diode (LED) light source including a printed circuit board, a heat sink, a plurality of heat conductors, and at least one LED chip. The printed circuit board (PCB) has a plurality of holes. The heat sink connects under the PCB for conducting heat. Each heat conductor is formed on the heat sink corresponding to each hole of the PCB for conducting heat, and each heat conductor has a basin on the topside. The LED chip is attached to the basin of the heat conductor.

U.S. Patent Application 20060006820 by Roseman, et al. teaches a horticultural lighting system comprising a light source that emits specific and specialized light spectra and is adjustable through the use of a control interface, which is able to support plants from seedling to mature flowering and fruiting adults. The lighting system utilizes a power source to energize a lighting fixture. A given lighting fixture includes high efficiency luminary devices that may have varying color combinations and spatial arrangements. A substrate provides support and thermal management. Electrical connectors allow multiple lighting fixtures to be connected to a single power source. A switching device allows linear control of intensity, time and color parameters of the emitted light, and is programmable to simulate photoperiods and spectrum shift. Roseman describes the system as being optimized to stimulate growth in plants during times of different light-intensity and light-spectrum needs. The Roseman design takes into consideration various factors so the claimed lighting system is described as operating at the highest possible efficiency and exhibiting the longest possible life.

U.S. Patent Application 20060254135 by Dubuc discloses a method and apparatus for irradiation of plants using light emitting diodes. The method uses LEDs to supplement natural light in a greenhouse and a support structure for attaching LEDs in a greenhouse so that the plants receive substantially even light distribution from the LEDs and minimal natural light is blocked by the lighting system. A narrow attachment rail is used to suspend a strip of LEDs from the frame structure of the greenhouse.

U.S. Patent Application 20070058368 by Partee et al. describes a high brightness LED system that generates radiometric light energy capable of controlling growth of plants from seed to full maturity. According to one or more aspects of that invention, a unit is disclosed that provides artificial light to promote plant growth. The unit utilizes red and blue light emitting diodes (LEDs) to emit wavelengths of light that are more favorable to plant growth. In particular, blue LEDs are interspersed with red LED's to broadcast a desired range of light. Although the LEDs operate at lower temperatures than conventional artificial light sources and thus allow the unit to be placed closer to plants for more efficient growth, the unit includes a heat sink to disperse even more heat. Separate switches are included to control the red and blue LEDs to allow controlled exposure to different light sources to facilitate desired plant growth.

U.S Patent Application 20070268693 by Crabb, et al. teaches a method and apparatus of lighting a marine habitat for growth utilizing an LED light system. The light system includes an LED light source, a power supply for such light source and a controller for controlling the activation status and the intensity of the LED light source.

The foregoing patents and patent applications reflect the current state of the art. Reference to, and discussion of, these patents and patent applications is intended to aid in discharging Applicant's acknowledged duty of candor in disclosing information that may be relevant to the examination of claims to the present invention. However, it is respectfully submitted that none of the above-indicated patents and patent applications disclose, teach, suggest, show, or otherwise render obvious, either singly or when considered in combination, the invention described and claimed herein.

One objective of the horticultural industry is to grow plants as naturally as possible while minimizing waste in a controlled environment where growth rates and increased yields could surpass the natural environment. However, this has proven to be impossible to achieve as many aspects of the way nature nurtures life on this planet is still beyond our understanding or is so complex in its simplistic way of achieving it. As many disciplines across numerus scientific fields are required to fathom its complexity, it is noticed in the industry by botanist, microbiologist and growers that something is missing, and it becomes a constant battle to get the correct recipe for success, one that works according to the scientific way for all plant types.

Plants do have a nervous system based on action potentials transmitted along phloem conduits but which in addition, through anastomoses and other cross-links, forms a complex network. The emergent potential for this excitable network to form a mental state is unknown, but it might be used to distinguish between different and even contradictory signals to the individual plant and thus determine a priority of response. This plant nervous system stretches throughout the whole plant providing the potential for assessment in all parts and commensurate with its self-organizing, phenotypically plastic behavior. Plasticity may, in turn, depend heavily on the instructive capabilities of local bioelectric fields enabling both a degree of behavioral independence but influenced by the condition of the whole plant.

Plants use photosynthesis to convert water and carbon dioxide to create organic compounds such as cellulose or glucose. It is well-established that artificial lights can be a substitute for natural sunlight. In addition to conventional incandescent lights, High Intensity Discharge (HID) lamps, such as Metal Halide (MH) and High-Pressure Sodium (HPS), have been used to grow plants. Fluorescent lamps are another example of artificial illumination used to grow plants. Some plant growers desire the ability to control the amount of light provided to the plant.

HID and fluorescent lamps require an electronic ballast for operation, which makes controlling the light intensity a challenge. Light emitting diodes (LEDs) are new a lighting technology in the grow light industry. LEDs emit light at specific wavelength bands depending upon the type of diode. Because of this narrow wavelength band, a white LED is actually comprised of a mix of different color LEDs to create the white light. The intensity of an LED may be controlled as well. Therefore, LEDs may be dimmed.

Like any other industry, the agricultural industry seeks to increase production and lower operating costs of its products. Generally, plants exposed to more red light tend to grow stouter and with broader leaves. Plants exposed to more blue light tend to grow faster and taller but with thinner stems and smaller leaves.

Research has determined that the 660 nm wavelength is crucial to trigger flowering in a plant. In some plant species the 660 nm wavelength must not be present longer than 12 hours per day in order for the plant to flower and to continue to flower. The solution has been to provide illumination for less than 12 hours per day and time manage the light source. This, in turn, limits or decreases yield.

For at least these reasons, a need exists for systems for enhanced plant growth using lasers.

SUMMARY

Systems and methods disclosed herein can utilize lights, magnetic fields, earthing, resonance and ionic scalar waves for optimizing the growth of plants. In it is desirable for those in the industry to have a grow enhancement and lighting system that is capable of increased yield and increased grow rate. The systems and methods described herein can have advantages over conventional and currently available systems in the market. The system can combine numerous fields of discipline in a novel way to increase growth rates with increased yields with as little as possible waste, using computer-implemented methods to mimic aspects of the natural environment.

In one example, the system can include a lighting array that includes at least a laser and an LED light. The laser can emit monochromatic light having a frequency wavelength within a range of 600 nanometers ("nm") to 700 nm. For example, the laser can have a wavelength of 660 nm. The laser can be a solid-state laser diode.

A scalar energy source can be positioned within six inches of a plant. This can include positioning a scalar wave guide that provides scalar energy at the base of the plant. Another scalar wave guide can also condition water that is provided to the plant. The scalar wave guide can have an array of magnets, the array including first and second magnets organized such that opposing poles of the first and second magnets are adjacent to one another, wherein the controller selectively powers the array of magnets.

In one example, a controller monitors a resonance frequency that is provided by a feedback loop. The feedback loop is created using a grounding pin and passing current into the ground. Based on the monitoring, the controller can amplify a Schuman frequency for the resonance frequency. To do this, the controller can use the scalar wave guide in an example. The scalar wave guide can produce an electromagnetic cancelation field at a Shuman resonance frequency and amplify the electromagnetic cancellation field.

The controller can also adjust a wavelength of an LED within a spectrum of 660 nm to 700 nm to cause cell elongation and increase osmosis. The controller can also apply a phytochrome effect by switching the wavelength of the LED to a range of 710 nm to 750 nm. The phytochrome effect can be automatically applied for between two and six minutes during a flowering phase of the plant.

This can result in an improved growth for plants. In one embodiment of this invention a modular system comprising of solid-state LEDs and solid-state laser modules equipped with special diffraction lenses and phosphoresce coating. Incorporating a management arrangement with remote wireless interface. BLUETOOTH and Wi-Fi enabled for full online and off-line control and interface. User-friendly mobile app and grow optimization software as part of the management arrangement. Encapsulated in a sealed heat dissipation system, with enhanced efficiency and thermal management.

In one example, the system can utilize UV light at a wavelength specific to creation of UV light radiation and ozone. This UV light can act as an oxidant and photo oxidant to prevent disease and to trigger increased production of Tetrahydrocannabinol ("THC") in the case of marijuana plant species. However, the UV light can also increase growth production of other types of plants.

The scalar field can be generated by a series of magnets and counteract the negative effects of, amongst other things, electromagnetic smog. A further aspect of this invention incorporates a novel magnetic field arrangement with microprocessor control for growth enhancement. Yet a further aspect of this invention utilizes an Earthing system with management arrangement. A further embodiment of this invention is a novel way to induce and maintain of Schuman resonance frequency in the grow environment. Yet another aspect of this invention is a novel electromagnet with frequency enhancement acting as a magnetohydrodynamic system to treat irrigation water.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In one example, a controller can manipulate the light frequency of a laser and a LED, which can be part of a light array. The light array can include a grow light where the 660 nm frequency band may be turned off. The light array can be part of an automated plant management system, preprogrammed into the lighting system. The controller can adjust light wavelengths, such as to regulate growth with blue light for stouter plants capable of sustaining larger leaves and blossoms. The adjustments can include adjusting a wavelength of the LED within a spectrum of 660 nm to 700 nm to cause cell elongation and increase osmosis. The controller can also apply a phytochrome effect by switching the wavelength to a range of 710 nm to 750 nm, wherein the phytochrome effect is automatically applied for between two and six minutes during a flowering phase of the plant.

The system can also include a scalar energy source close to the plant, such as with a magnet array or ring at the base of the plant. This can help amplify a Shuman frequency based on a resonance frequency detected in a ground loop for the plant.

The lighting system can incorporate a mechanism of carbon dioxide production and passive heat and ventilation management. The system can also mimic the other factors being discharged from the sun, other than light energy as part of the electromagnetic spectrum.

Figure 1:
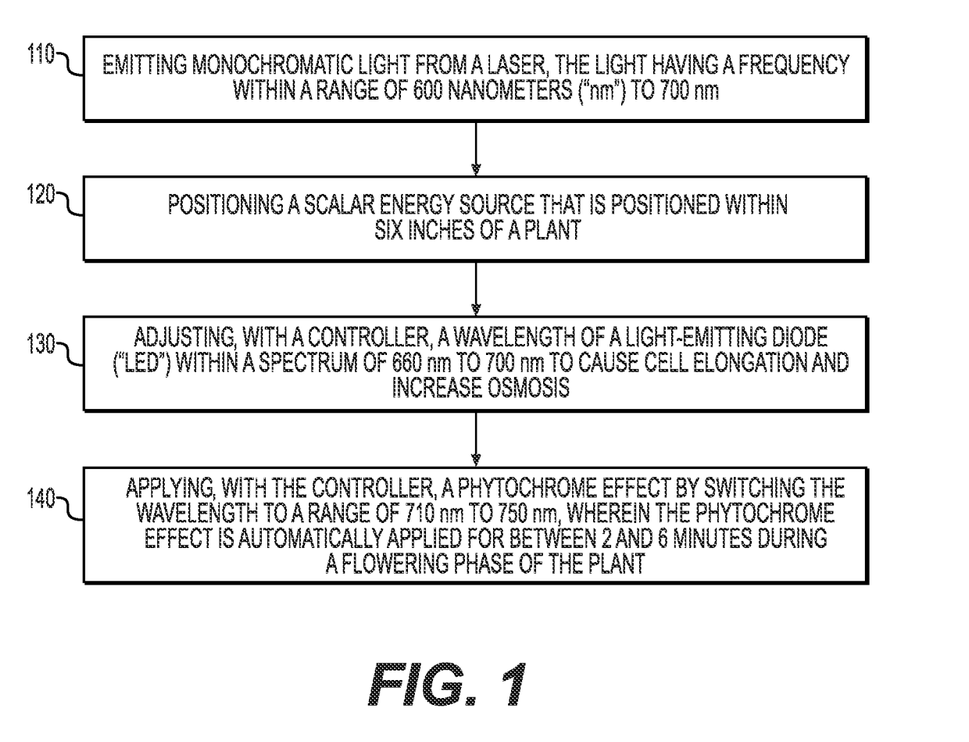
FIG. 1 is an example flow diagram for enhancing growth using an LED, laser, and scalar energy.

FIG. 1 includes example stages performed for enhancing plant growth. These stages can occur simultaneously or in any order. At stage 110, a laser emits a monochromatic light. The light can have a frequency range between 600 nm to 700 nm in one example. This can help create an Emerson enhancement effect on the plant.

The laser can be part of a laser array. The laser can emit light with a wavelength of 660 nm. An input device can send a signal to the controller to command the array to change from a first state where the array emits light comprising 660 nm band to a second state where the array emits light comprising a laser at 660 nm. Meanwhile, an LED array can be set to emit light of about 660 nm and 700 nm at stage 130. This combination can act as a super energy pump and further enhancement to the Emerson effect. For example, 663 nm can be used as an energy pump. At stage 140, a phytochrome effect can be applied at 730 nm during flowering to extend the amount of time a flowering plant can handle light.

At stage 130, the controller can adjust the wavelength of an LED, which can be part of an array. Several adjustments are possible for promoting growth. For example, settings to grow a plant can including emitting UV light between 310 nm and 400 nm, blue light between about 400 nm and 500 nm, red light at about 630 nm, and red light within a spectrum of about 660 nm and 700 nm, creating an Emerson enhancement effect. An input device for producing a 600_nm_ON command and a 660_nm_OFF command is in communication with a controller. The controller is in communication with the LED array and the input device. The controller responds to the 660_nm_ON command by causing the array to emit blue light between about 400 nm and 500 nm, red light at about 630 nm and a red light at about 660 nm and 700 nm the controller responds to a 660_nm_OFF command by causing the array to emit blue light between about 400 nm and 500 nm and red light at about 630 nm. Additionally, the LED array may include infrared light at 740 nm. The input device may also include a command to the controller to cause an increase or decrease in the intensity in any or all of the blue light, the 630 nm red light and the 660 nm and 700 nm red light.

In another embodiment the input device may execute a command to the controller to cause an increase or decrease to the intensity of the blue light with respect to the intensity of the 630 nm red light and the intensity of the 660 nm red light to be a ratio.

In another embodiment, a grow light comprises a LED array for emitting blue light at a band between about 400 nm and 500 nm, red light at a band at about 630 nm, 660 nm and 700 nm. At least one input device can selectively control the intensity of at least one light band. The controller can communicate with the LED array and the input device were the controller responds to a signal from the input device to command the array to change from a first state where the array emits light comprising a 660 nm and 700 nm band to a second state where the array emits light that does not comprise a 660 nm and 700 nm band. The LED array of the grow light may also include infrared light at a band at about 740 nm in a first state the array emits light together with the 660 nm and 700 nm array.

At stage 140, the controller can respond to a signal from the input device to command the array to change from a first state where the array emits light comprising about 740 nm band to a second state where the array emits light that does not comprise a 660 nm and 700 nm band but only a 740 nm band. This can cause a phytochrome effect during flowering to extend the amount of time a flowering plant can handle light. The phytochrome effect can be applied for between two and six minutes, in an example.

A method of providing light to a plant comprises providing an LED array adapted to emit blue light at a band between about 400 nm and 500 nm, red light at a band at about 630 nm and red light at a band at about 660 nm and 700 nm respectively. The method further comprises conducting electrical power to the LED array to emit blue light at a band between about 400 nm and 500 nm, red light at a band at about 630 nm and red light and at a band about 660 nm and interrupting electrical power to the LEDs adapted to emit a 660 nm band within the LED array.

Scalar energy can be created and added to the system by controlling the lights in one example. This can be done to cause a resonance frequency at the Schuman resonance frequency in an example. The Schuman frequency is a natural resonance in the earth's magnetic field at 7.83 Hz. This frequency can be being applied to the laser and controlled and managed though algorithms in the microprocessor. Yet a further aspect of the invention relates to Schuman resonance frequency 7.83 Hz and derivatives of Schuman frequencies being applied to the laser, controlled and managed though algorithms in the microprocessor.

In one example, the scalar energy source can be created when the controller commands the laser array comprising 660 nm light in a first state to change to a second state where the array emits light comprising a laser at 660 nm, a LED array of about 660 nm and 700 nm, and in at the same instant have a secondary LED and laser array occupying the same radiation area and space in a opposite phase in synchronization with the first LED laser array but in a 180 deg phase relative to the first. This combination can create a standing three-dimensional scalar wave capable of transferring the light energy in a highly efficient state. This phase relationship combined with the Emerson enhancement already created combination acting as a super energy pump and further enhancement to the Emerson effect. A further aspect of this phase relationship in combination with the fundamental Shuman resonance of 7.8 Hz and multiples of the extra low frequencies from 1 Hz to 200 Hz and potentially into the Terra Hertz wave bands and its 180 deg out of vase synchronization relationship generating square waves, sign waves and inevitably standing waves capable of traveling as a 3-dimensional scalar wave.

The scalar wave being present in a three-dimensional waveform does not merely travel as a waveform but as a wave field, this field is self-standing in nature and self-canceling at the same time with the potential of carrying energy and data over large distance with minimal loss.

This nature of the standing wave created, being a square or sine wave in a synchronous 180 degree out of phase relationship has the potential to be highly energy efficient and capable of transferring information and energy to the plant in a novel way. The principal described in the embodiment above is not limited to light energy but also electromagnetic and other wave forms and subsequent applications of the total electromagnetic spectrum.

This novel way coupled with the earth's natural energy and ionic fields has a harmonizing effect, capable of cellular healing and cancellation of genetic trauma and negative genetic memory. The effect of the scalar field can be present even after the initial wave generator has been removed or switched off, it creates a closed field loop unlike the conventional open-ended sign and square waveforms.

At stage 120, scalar energy can be emitted from a scalar energy source that is positioned close to the plant, such as within six inches from the plant. The scalar energy can further assist the system. In a further embodiment of this invention a scalar field wave guide of novel design is proposed. Plants do have a nervous system based on action potentials transmitted along phloem conduits but which in addition, through anastomoses and other cross-links, forms a complex network. The emergent potential for this excitable network to form a mental state is unknown, but it might be used to distinguish between different and even contradictory signals to the individual plant and thus determine a priority of response. This plant nervous system stretches throughout the whole plant providing the potential for assessment in all parts and commensurate with its self-organizing, phenotypically plastic behavior. Plasticity may, in turn, depend heavily on the instructive capabilities of local bioelectric fields enabling both a degree of behavioral independence but influenced by the condition of the whole plant.

The scalar field creates a natural environment countering the negative effects of manmade EMF's and negative energy patterns exasperated by the bombardment of positive ions. The inventor seeks the claim of novelty by including in his design a magnetic flux field combined with a scalar field creating a harmonizing magnetic flux and guiding that flux through a crystalline silicon pyramid structure creating a cancelation field on demand and focusing the apex towards the area to be treated, creating a scalar wave field in the area to be treated in turn strengthening its bioelectric fields through its nervous system based on action potentials transmitted along phloem conduits, through anastomoses and other cross-links, forms a complex network and potential for growth enhancement.

Cancellation can reduce the magnetic energy of the hypothetical "open" field state. In a sheared arcade field, steady cancellation can add free energy to the actual coronal field. Considering relevant boundary conditions, the horizontal magnetic flux density can increase while normal flux is cancelling, even in the presence of constant resistivity. This can help plants grow in a more natural way. For example, the sun discharges not only visible light energy but also an array of other electromagnetic energy. The scalar energy source can mimic this other electromagnetic energy through ionic field manipulation.

The scalar energy source can cause magnetic flux cancellation detectable in magnetograms of the solar photosphere. These graphs can show the mutual apparent loss of magnetic flux in closely spaced features of opposite polarity. Physically, this phenomenon relates to magnetic reconnection. In the quiet sun, cancelling magnetogram features typically originate in distinct flux systems and coincide with coronal bright points.

Cancellation tends to reduce the open field energy, and that cancellation in a sheared arcade can increase the coronal free magnetic energy, cancellation occurs when oppositely signed magnetic fluxes threading a surface S, in the presence of plasma, come into contact and equal amounts of oppositely signed flux "disappear" from S during a time interval $\Delta t$.

The potential field is current free, i.e., $4\pi J(P)=c(\nabla \times B(P))=0$, implying $B(P)$ can be expressed as the gradient of a scalar potential, $B(P)=\nabla_\chi$. The potential field is of interest because it is the unique, minimum energy field that matches the same normal field boundary condition as B. Since the photosphere remains essentially unchanged on the rapid timescale of dynamic coronal field evolution ($\tau p$–sph À $\tau cor$), the (P) energy available to drive such evolution is the free magnetic energy, UF=UM–UM, where $$U_M^{(P)} = \int_V dV(B^{(P)} \cdot B^{(P)}).$$  Equation 1

Topological changes in the form of magnetic reconnection can liberate free nonpotential energy, which is converted into heating of plasma, acceleration of particles, and kinematic motion of coronal plasma. People often refer to electromagnetic energy (in the form of photons), the Sun also emits solar wind but most of the Earth's surface is well shielded from its particles (mostly protons, electrons and alpha particles, i.e. groups of two protons and two neutrons) by its magnetic field, these particles do "power" things like auroras. The sun can also emit a colossal number of neutrinos but given these hardly interact with the Earth's matter—most launched at us pass through the Earth unimpeded—they aren't practically usable as a source of energy.

The scalar energy source seeks to energize the plant environment in close proximity to this scalar field. Energizing the plant in a non-conventional electromagnetic cancelation field whereby the device harnesses the fundamental earth Shuman resonance of 7.83 Hz and amplifies it in a novel way to create anions in a predominantly cation rich environment, making it conducive to plant growth enhancement.

The effect of different types of laser on the seed germination and on the rate of the growth of plants can improve sowing qualities of seeds, shorten the phases of plant development, produced more vigorous plants, increase the yields of both stems and seeds to a considerable extent, and increasing the germination by 10-15%. The stimulating effect of radiation can also increase plant height, stalk thickness, height of first ear formation, number of leaves and leaf area size. The mutation frequency of plants derived from wet seeds can be higher than that of plants derived from irradiated dry seeds. Utilizing the lighting and control systems described herein, the system can implement these technologies in a novel way.

Traditionally agriculture has been performed under natural sunlight. Green plants use little light in the yellow and green part of the spectrum. Green plants reflect most of the yellow and green light which is why they appear green. Green plants primarily use blue light, which consists of light between 400 nm and 500 nm and red light, which is in the regions of 630 nm and 660 nm, during photosynthesis. There is some debate about what proportion of red to blue light is optimal for plant growth. NASA has indicated that the ratio may be 3 to 4:1. Accordingly, independent adjustment of the red and blue bands would provide advantages to growers in the area of power consumption and growth optimization.

Figure 2:
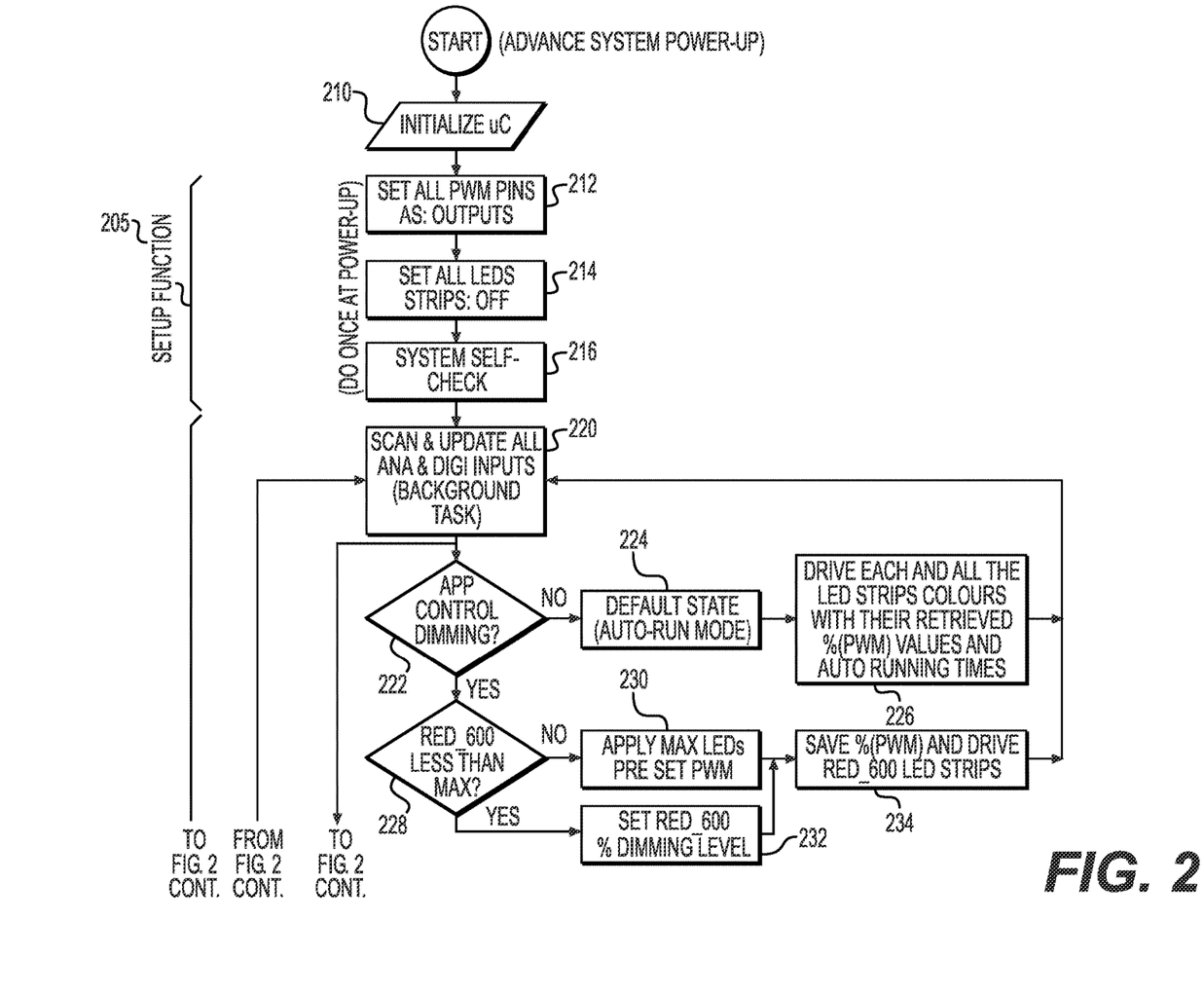
FIG. 2 is an example flow diagram for enhancing growth using an LED, laser, and scalar energy.

FIG. 2 is an example flow chart for enhancing plant growth using an electronic control system. Setup functions 205 can occur at power up. Loop functions 218 can occur repeatedly while the system in powered on.

At stage 210, the system can initialize the controller. The controller can be a processor or a microcontroller. The controller can be initialized based on software running, in an example. The controller can comprise the processor of a user device, such as a computer, in an example. The controller can also be specialized with its own pins for controlling different lights. Initializing the controller can include defining input an output functionality and hardware, in an example.

At stage 212, pins of the controller are set as outputs. This can include loading parameters for output values that cause the frequencies or intensities of the lights to change based on the output values at the output pins. At stage 214, the controller initially sets the LED strips (of the array) to off.

At stage 216, the controller can perform a system check. This can include blinking sequentially the different LED strips, such as a half a second on and a half a second off. Custom programmed parameters can be retrieved from memory.

At stage 220, all inputs can be scanned, and background tasks can begin. This can include running stages 222, 228, 236, 244, 252, and 258 in any order or simultaneously. At stage 222, the controller checks whether app control dimming is enabled. If not, a default state 224 for automatically running the lights is retrieved and executed at stage 224. This can include driving the LED strip colors with their retrieved values and running times at stage 226.

If app control dimming is enabled, then at stage 228 the controller can check whether the red light is less than a maximum brightness value. If not, then at stage 230, the controller can dim the red LED to the maximum allowed value. If so, then at stage 232 the controller can set the red LED to a dimming level defined based on grow timing. For example, the red can be adjusted relative to blue such that the red to blue ratio is between 3:1 to 4:1.

In one example, the LED array comprises blue LEDs, red LEDs, infrared LEDs, and UV LEDs. The red LEDs can include red LEDs having a wavelength of about 630 nm and dark red LEDs having a wavelength of about 660 nm, with still other red LEDs having a wavelength of about 700 nm. The LED array 5 may further be comprised of an infrared LED having a wavelength of about 740 nm. In one example, the controller controls red and blue light levels relative to one another. This can include modulating the power supplied to the blue LEDs between 0% and 100%. The red control input can govern the red-light band at about 630 nm and modulates the power supplied to the red LEDs between 0% and 100%. The dark red control input can govern the dark red-light band at about 660 nm and modulates the power supplied to the dark red LEDs between 0% and 100%.

An input device may allow for user selection of how the controller interacts with the LEDs. This can include pulse width modulation. The timing of the power supplied to the LEDs may also be electronically controlled, for example by a timer or a timing circuit.

At stage 234, the current state of the LEDs can be saved, and the LEDs can be driven according to the control program.

The same kind of control can be implemented for the other colors, blue and white, as well. Each color can be on its own LED strip in one example.

At stage 236, the controller can check whether or not the laser is on. If so, then at stage 238 the controller can retrieve laser power levels and at stage 240 drive the lasers. This can include cycling the lasers, such as 30 seconds on and 15 seconds off. This can cause the laser LED strips to emit UV light at stage 250.

The timing can be customer programmed in one example. Timing parameters can be stored in a non-transitory, computer-readable medium that is accessible by or part of the controller.

At stage 244, the controller can determine if the UV lights should be on or off. If on, then at stage 246, the UV power settings can be retrieved, and the UV light strip can be driven at stage 248. This can cause the UV lights to emit light onto the plant at stage 250.

At stages 252 and 242, the controller can monitor and power other sensors, such as determining whether to turn a phytochrome effect on or off. Tasks related to those sensors, such as powering a scalar wave guide to increase a resonance frequency can be done at stage 256.

At stage 258, the controller can run the earthing process, which can include amplifying the resonance frequency. At stage 260, the controller can monitor a feedback loop of the earthing system to detect if any alternating current has compromised the purity of the earth resonance. It is possible for leakage to occur from a building or power system where the growing is taking place, disrupting natural resonance that is needed for optimal plant growth. Leakage can manifest itself as a 50 Hz to 60 Hz frequency on an earthing cable. This can cause plant growth to suffer.

If the leakage is present at stage 260, then a Schumann resonance frequency (e.g., 7.83 Hz) can be amplified at stage 262. In one example, the Schumann resonance frequency can be injected into the earth through the earthing lines. To do this, the controller can cause a scalar wave guide to create the Schuman resonance frequency on the earthing line or at the base of the plant. A green LED can turn on at stage 262 to indicate this action.

In another example, a low frequency sensor is programmed with a threshold to trigger above the second and third order Schumann harmonic scales, such as at 14.1 Hz and 20.3 Hz. This can also indicate leakage of alternating current in the 50 Hz to 60 Hz range. The system can disconnect the earthing system in response, turning off a green LED at stage 264 in an example.

Figure 3A:
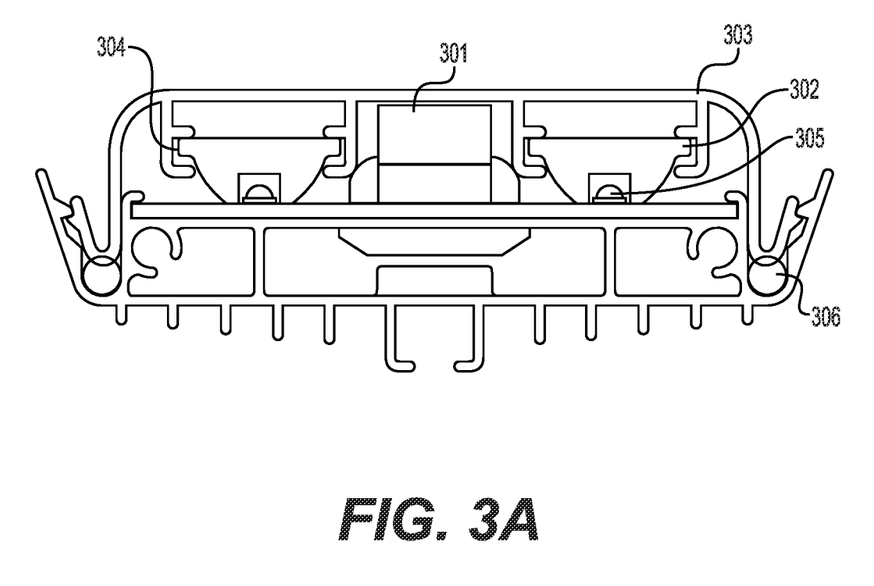
FIGS. 3A, 3B, and 3C are example illustrations of a lighting assembly.

FIG. 3A illustrates an example light apparatus for use above a plant in a growth media. A laser module 301 can be housed inside the enclosed casing and attached to the printed circuit board. The number of laser modules 301 can vary and be distributed in such manner as to uniformly cover the area to be treated. The light bar can include both lasers 301 and LEDs 305 in an example. A waterproof cover 303 can be attached to the main housing and sealed into place by silicon seal 306. Cover 303 can have a guide cavity 304 to allow lens 302 to be removed and exchanged while still maintaining a waterproof seal. This can allow, for example, a user to change the angle of LEDs 305 without disrupting operation of the rest of the lighting array. The lens 302 can be elongated and linear in an example but can be swapped out for other uses without changing the fixture.

The light bar can be specific to a color, such as red, blue, or white, in an example. The light bar can be controlled by a controller to change light wavelength and intensity, in an example.

Figure 3B:
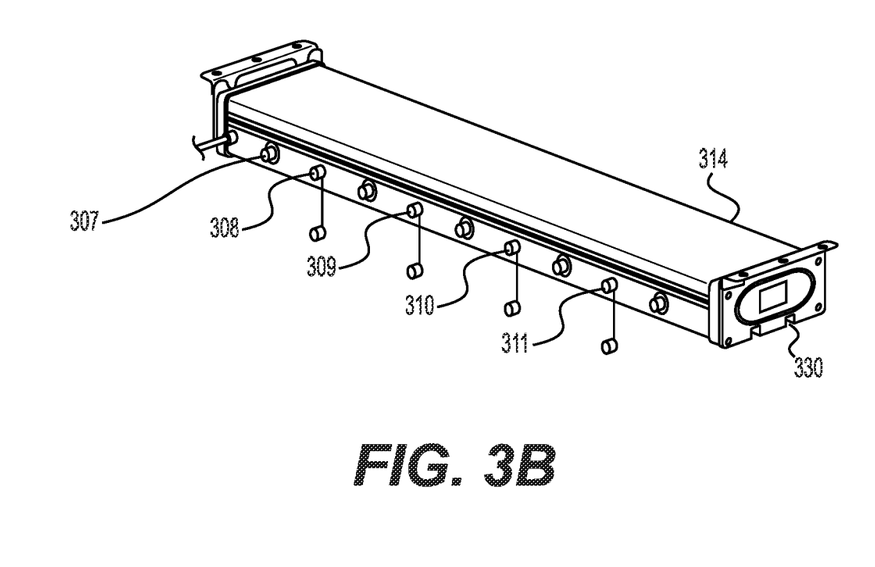

FIG. 3B is an example illustration of an LED grow light apparatus having a body 314. The main body 314 of the light fixture can house an electronic driver and power supply 307, which can have multiple outputs. The body can include multiple interface connectors to the LED and laser arrays. Connector 308 can be for powering an earthing system as described in FIGS. 4A and 4B. Connectors 307, 309 can connect to a scalar wave guide of FIG. 5, in an example. Connectors 311, 310 can attach to an external UV light generating device, with connector 311 being an auxiliary output control. The controller can reside inside the housing, in an example. Alternatively, the housing can receive commands from an external controller.

Guide openings 330 can accept track supports from light modules (e.g., LED strips) in an example, such as the module of FIG. 3A.

Figure 3C:
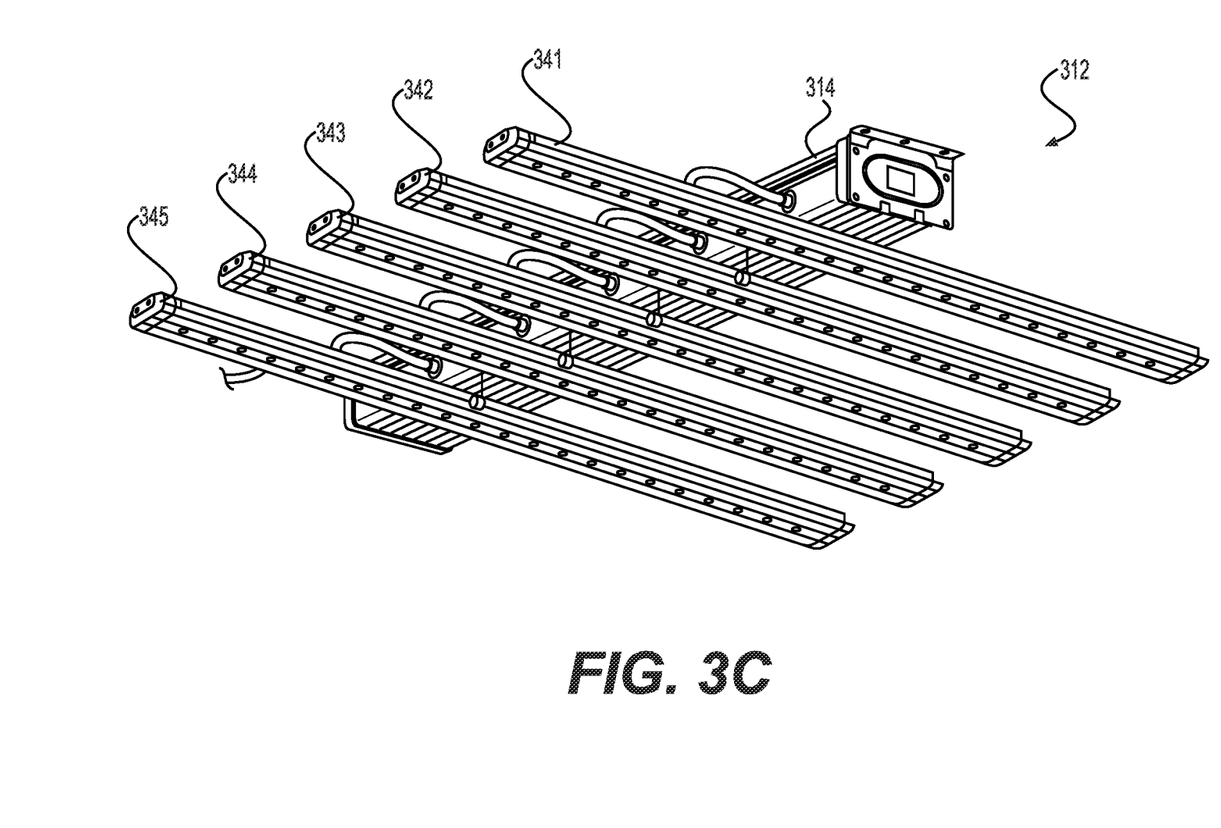

Turning to FIG. 3C, an assembled grow light system 312 is shown. The main body 314 is fitted with lighting modules 341, 342, 343, 344, 345. These lighting modules 341, 342, 343, 344, 345 can form the LED array. The modules 341, 342, 343, 344, 345 can receive power from the main body 314. Commands to change wavelength or power can also be sent from the main body 314 to the array.

The modules 341, 342, 343, 344, 345 can slide into position using the guide openings 330 shown in FIG. 3B. Bolts can attach through a pressure plate, allowing the two mechanisms to slide into each other.

Figure 4A:
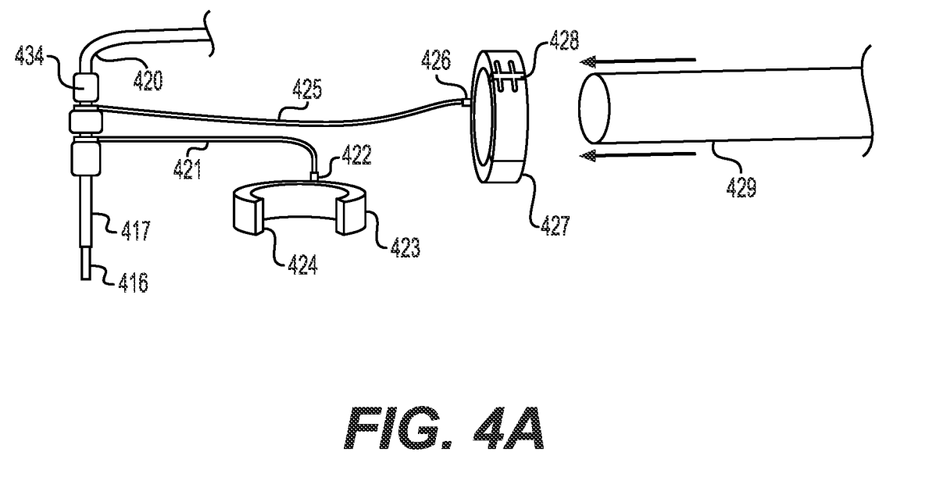
FIGS. 4A and 4B are example illustrations of system components to enhance plant growth.
Figure 4B:
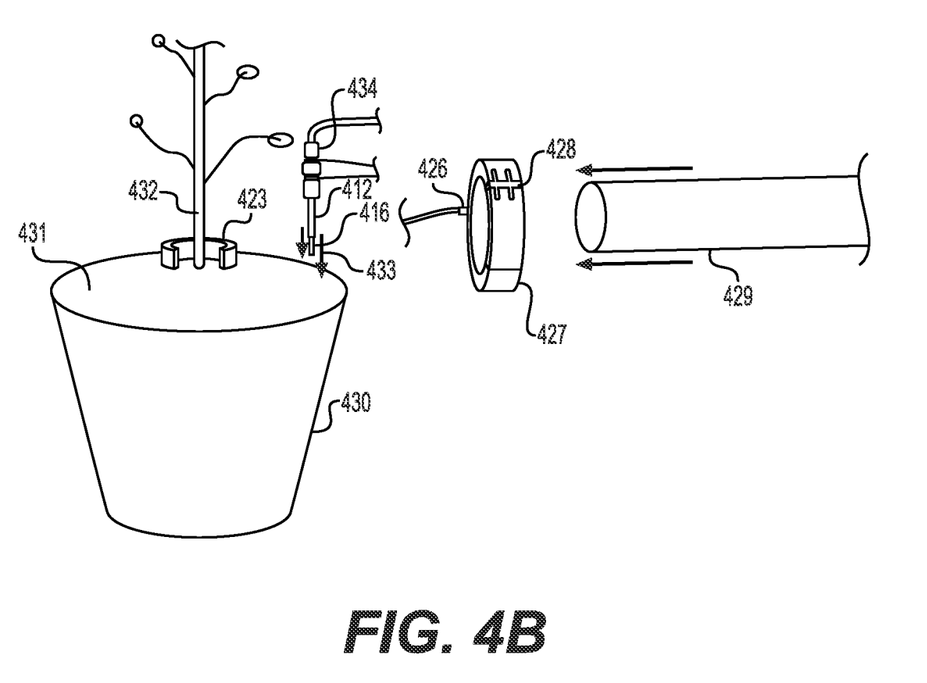

FIGS. 4A and 4B are example illustration of system components to enhance plant growth. Turning to FIG. 4A, an earthing system 434 can include a ground loop between pins 416, 417 and one or more magnetic scalar wave guides for amplifying frequencies, such as the Schumann resonance frequency. Scalar wave guide 423 can be placed at the base of a plant, such as by using opening 424. Scalar wave guide 427 can be used as magnetic water conditioner by placing it around a water line 429. A clamp or hinge 428 can attach the scalar wave guide 427 to the water line 429 in an example.

The ground loop pins 416, 417 can comprise a frequency transmitter and earth integrity sensor loop. These pins can transmit the fundamental 7.83 Hz Schumann frequency and possible variants of this fundamental frequency into the grounding pin and returning to the circuit monitoring the integrity of the return frequency with a comparator circuit. When an alternating current mains frequency above a predetermined tolerance is detected, the system can disconnect pin 416, in an example. The controller can inform the user of the integrity of the leakage and earth cable being compromised, while still maintaining the 7.83 Hz Schuman frequency.

A line 420 can connect the earthing system 434 back to a main body that supplies power and control. Similarly, lines 421 and 425 can connect back to the controller for power and control at the scalar wave guides 423, 427. These lines can connect to the guides at connection points 422, 426.

As shown in FIG. 4B, a plant 432 can reside in a container 430. The container can be filled with soil 431 or a hydroponic solution. A scalar wave guide 433 is placed at the base of the plant 432. The other scalar wave guide 427 is used at the water line 429 for magnetic water conditioning. The ground loop between pins 416 and 417 can form a frequency transmitter and earth integrity sensor loop. The feedback loop can allow for transmitting the fundamental 7.83 Hz Schuman frequency and possible variants of this fundamental frequency into the grounding pin and returning to the circuit monitoring the integrity of the return frequency with a comparator circuit. When any alternating current frequencies above a predetermined tolerance are detected, the system can disconnect pin 416. The controller can send a signal to a user device to inform the user of the integrity of the leakage, while still maintaining the 7.83 Hz Schuman frequency.

Grounding pin 416 can be placed in soil or in a hydroponic system. Frequency transmitter 417 can also monitor the 7.83 Hz signal within a tolerance range. Scalar energy apparatus line 420 can apply scalar energy to the plant. In one example, scalar energy is applied through pin 433.

Figure 5:
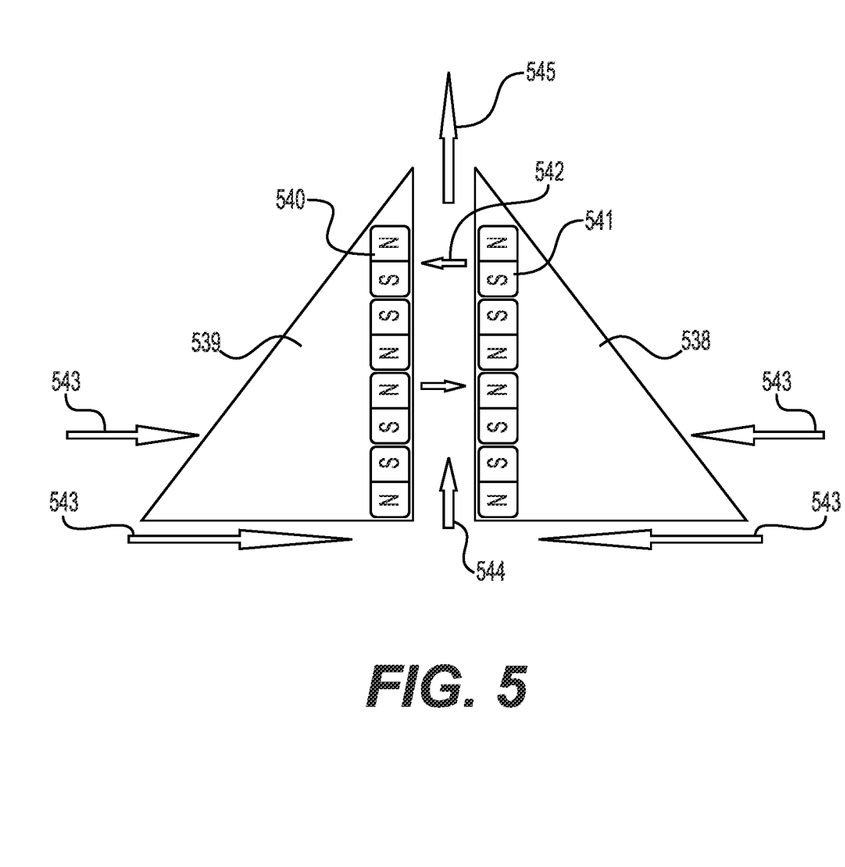
FIG. 5 is an illustration of the magnetic scalar wave guide.

FIG. 5 is an example illustration of a scalar wave guide. The scalar wave guide can use magnetic cancellation to output a scalar wave 545. The scalar wave guide can include inward and upward directions 544 of the collector and distributer fields. The scalar wave guide can be placed at the base of the plant stem or in larger devises in the direction of the area to be energized. It can also be controlled by the microcontroller. The magnets can be passive or an active electromagnetic system, depending on the example. The magnet arrays 540, 541 can have magnetic polarities facing towards each other in a series/parallel manner. This cancellation magnetic wave arrangement coupled with a calcium-silicate, limestone, crystalline pyramid mechanical arrangement 538, 539 can act as a scalar wave guide.

Multiple scalar wave guides can be arranged in such a manner to increase the effect of the scalar energy. The scalar wave guide can create a collector field 543, 544 and a emitter field 545. The scalar wave guide can be aligned with the emitter field 545 in the direction of energy required. A reversal of the direction can drain energy from living organisms. Other uses and embodiments of this device is not covered in this patent application.

In this example, calibration distance 542 can be narrowed or widened for maximum efficacy. Structure 538 can be a calcium-silicate or limestone crystal structure. The magnetic arrays 540 and 541 can be arranged with similar polarities facing each other in a series/parallel manner.

As mentioned, in one example the scalar wave guide is not passive but can actively be pulsed with an array of electromagnets 540, 542 imbedded inside the crystalline structure 538, 539. This resonant electromagnet array 540, 542 imbedded inside the calcium-silicate, limestone crystal structure can be at the 7.83 Hz Schuman resonate frequency or multiples of it.

Figure 6:
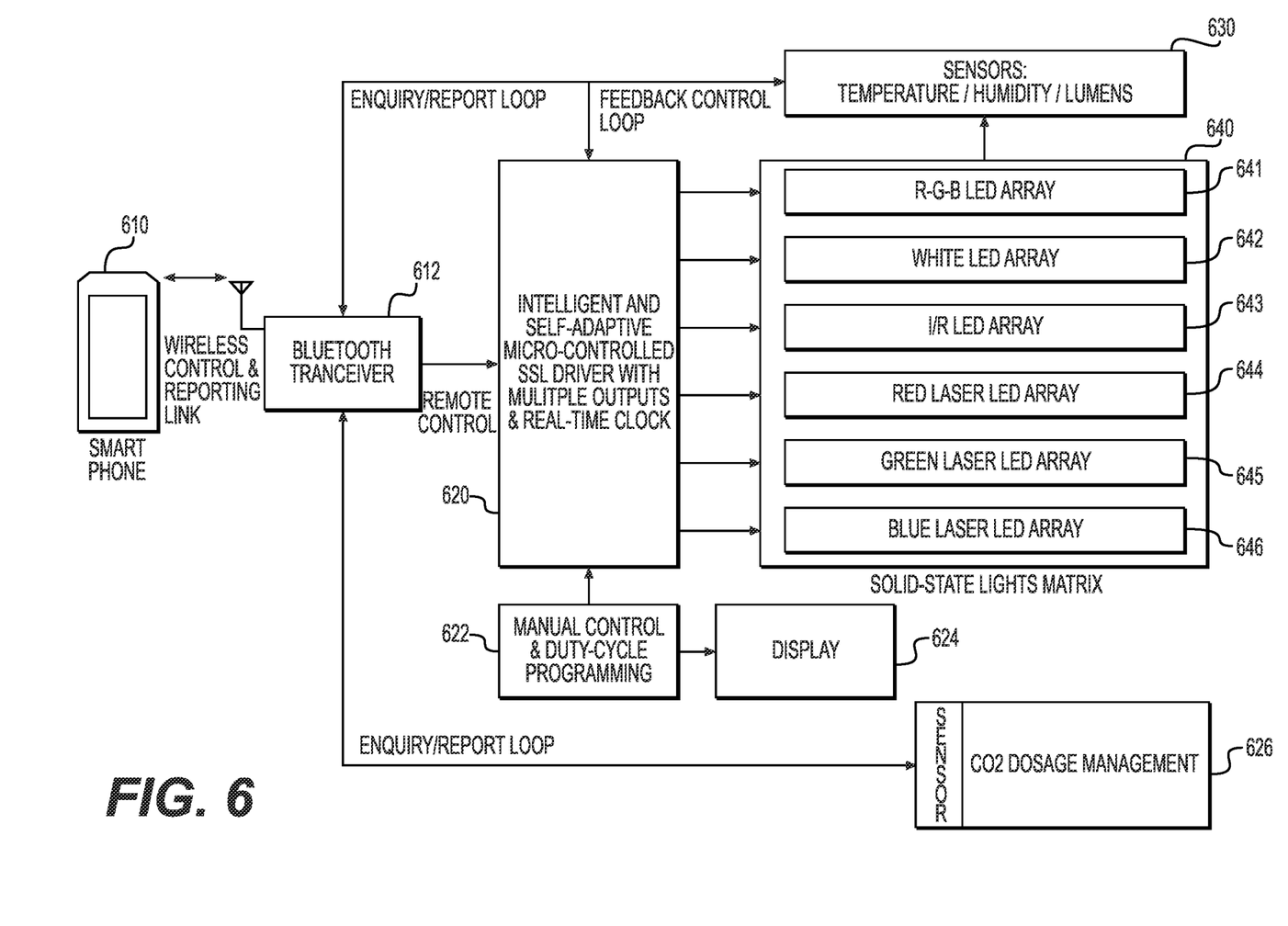
FIG. 6 is an example diagram of system components for enhancing plant growth.

FIG. 6 is an example system diagram with system components for growth enhancement. A user device 610 can communicate with a controller 620 to drive the lights and scalar wave guides. The user device 610 can be any processor-enabled device, such as a phone, tablet, laptop, or computer. The user device 610 can run an application that visualizes controller states. This can allow the user to know which lights are active, for what amounts of time, and even which effects the system is attempting to achieve. The controller 620 can be any type of processor or device that includes a processor.

In one example, the user device 610 is on a local network with the controller 620, such as by connecting through a Bluetooth transceiver 612. Other portions of the system can also communicate with the controller using the local network. For example, sensors 626, 630 around the plant can transmit information to the controller, either wirelessly or through a wire. The controller 620 can use variables programmed and stored in a medium 622.

The controller can access those variables to perform the growth-related tasks. The controller 620 can also output certain statuses to a display 624. The display 624 can be a screen. Alternatively, more basic display types, such as lights themselves, can be used.

In one example, the controller 620 can control various lighting arrays 640, 641, 642, 643, 644, 645, 666. These arrays can include different combinations of colors, LEDs, or lasers. For example, array 640 can include red, green, and blue LEDs. Array 643 can include infrared LEDs. Arrays 644, 645, and 646 can include different color lasers. The controller 620 can manipulate the on/off status, intensity, or wavelengths of one or more of these arrays 640, 641, 642, 643, 644, 645, 666 to achieve the various growth effects described herein.

The LED grow light apparatus of the present invention provides an improved grow light fixture that may be used for the replacement of high intensity discharge (HID) lamp fixtures used for growing plants. The inventive apparatus includes a housing containing a plurality of both red and blue high-power LEDs mounted to a circuit board and powered by an onboard power supply. In addition to the aforementioned the present grow light system also incorporates laser diodes both at the UV and infrared part of the spectrum. A further embodiment of the invention makes provision for green laser diodes to be added with full spectrum lighting being the objective, managed by an onboard controller and driver system, this being remotely controlled via Wi-Fi and Bluetooth, but not limited too. The combination of red and blue LEDs has been determined to provide an ideal light spectrum for growing plants. Control circuitry may include separate, infinitely variable controls to enable independent adjustment of the red and blue LED light output. A plurality of thermal vias made of copper, aluminum or other thermally conductive material preferably extend through the circuit board to conduct heat from the LEDs to a heat sink mounted on the back of the circuit board, the novel design of the heat sink allows for heat to be sucked away from the LED's due to thermal differential and cannot be reintroduced back to the LED array as no thermal contact is present other than the point of downwards heat extraction, acting as a heat pump and a fan may be used to vent the heat to the outside of the housing but is not required in the present embodiment. The housing is mounted an appropriate distance above a plant in a growth media to provide user-controlled lighting for enhanced plant growth.

The inventive light emitting diode (LED) light fixture can replace an HID lamp consuming several times as much power, while still providing the necessary light energy for photosynthesis and growth through the use of the multiple high-power LEDs. And can add to the benefits already associated with LED grow lights through its onboard management and laser system. The inventive apparatus may be less expensive to manufacture than other LED grow light systems due to the use of the thermal vias, and modular design which enables the manufacture of the PCB on a single board, incorporating a laser system enhances the energy efficiency and growth time and yield.

The optional independent light intensity controls allow the user to adjust the red-light spectrum from off to fully-on through an infinite number of steps, and similarly adjust the blue light spectrum from off to fully-on through an infinite number of steps. This enables the user to customize the light spectrum for any plant type, as well as for the different growing stages for a given plant type. Alternatively, the red or blue intensity controls can be omitted for constant maximum light output operation more related to natural sun light at full spectrum. Also, one or more red and/or one or more blue LEDs can be replaced with white LEDs to supplement the narrow bandwidth of the red and blue LEDs, filling the valleys and creating full spectrum light.

It is therefore an object of the present invention to provide a new and improved grow light apparatus. It is another object of the present invention to provide a new and improved LED grow light apparatus that is inexpensive to produce and efficient to use. A further object or feature of the present invention is a new and improved grow light fixture that enables the user to customize the light spectrum for any plant type, as well as for the different growing stages for a given plant type. An even further object of the present invention is to provide a novel method for growing plants, using a phosphor scattered laser system. It is a further object of the invention to provide a novel method for producing carbon dioxide as integrated into the lighting system. It is a further aspect of this invention to have the carbon dioxide system regulated by growth vase conditioning and software housed onboard the control interface. It is a further aspect of this invention to have as part of its lighting housing a breathable patch for carbon dioxide production, for a replaceable cartridge of mycelium mass incorporating a vented cultivator of carbon dioxide. It is yet a further aspect of this invention to have a novel passive heat pump incorporated into the design of the heat sink by means of the principles of venture.

It is a further aspect of this invention to incorporate a magnetic crystalline scalar wave guide. It is a further aspect of this invention an earthing attachment to drop down from the light fixture and ground the plants beneath. It is a further aspect of this invention an earthing attachment with Schuman resonance frequency of 7.83 Hz as part of the earthing arrangement. It is a further aspect of this invention to have a feedback loop of the fundamental Schuman resonance frequency as a sensory mechanism to ensure the integrity of the earthing system.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of this application, which is measured by the claims, nor is it intended to be limiting as to the scope of the invention in any way.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

Other examples of the invention will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the invention being indicated by the following claims.

What is claimed is:

1. A method for growing plants comprising:
emitting monochromatic light from a laser, the monochromatic light having a wavelength within a range of 600 nanometers ("nm") to 700 nm;
positioning a scalar energy source that is positioned within six inches of a plant;
adjusting, with a controller, a wavelength of a light-emitting diode ("LED") within a spectrum of 660 nm to 700 nm to cause cell elongation and increase osmosis; and
applying, with the controller, a phytochrome effect by switching the wavelength of the LED to a range of 710 nm to 750 nm, wherein the phytochrome effect is automatically applied for between 2 and 6 minutes during a flowering phase of the plant.

2. The method of claim 1, wherein the scalar energy source is a scalar wave guide for placement at a base of a plant, the first scalar wave guide having an array of magnets, the array including first and second magnets organized such that opposing poles of the first and second magnets are adjacent to one another, wherein the controller selectively powers the array of magnets.

3. The method of claim 2, further comprising:
monitoring a resonance frequency that is provided by a feedback loop, wherein the feedback loop is created using a grounding pin; and
based on the monitoring, amplifying a Schuman frequency for the resonance frequency, wherein the amplification is achieved using the scalar wave guide.

4. The method of claim 2, wherein the scalar wave guide produces an electromagnetic cancelation field at a Shuman resonance frequency and amplifies the electromagnetic cancellation field.

5. The method of claim 1, wherein the laser includes a linear lens that can be decoupled without altering a fixture that houses both the LED and the laser.

6. The method of claim 1, wherein the laser is part of an assembly that slides on rails for positioning above plants.

7. The method of claim 1, wherein the LED frequency is adjusted in a band corresponding to a color red.

8. A system for growing plants comprising:
a laser that emits monochromatic light within a range of 600 nanometers ("nm") to 700 nm;
a light-emitting diode ("LED") with a lens;
a scalar energy source that is positioned within six inches of a plant; and
a controller that performs stages comprising:
adjusting a wavelength of the LED within a spectrum of 660 nm to 700 nm to cause cell elongation and increase osmosis; and
applying a phytochrome effect by switching the wavelength to a range of 710 nm to 750 nm, wherein the phytochrome effect is automatically applied for between 2 and 6 minutes during a flowering phase of the plant.

9. The system of claim 8, wherein the scalar energy source is a scalar wave guide for placement at a base of a plant, the first scalar wave guide having an array of magnets, the array including first and second magnets organized such that opposing poles of the first and second magnets are adjacent to one another, wherein the controller selectively powers the array of magnets.

10. The system of claim 9, the stages further comprising:
monitoring a resonance frequency that is provided by a feedback loop, wherein the feedback loop is created using a grounding pin; and
based on the monitoring, amplifying a Schuman frequency for the resonance frequency, wherein the amplification is achieved using the scalar wave guide.

11. The system of claim 9, wherein the scalar wave guide produces an electromagnetic cancelation field at a Shuman resonance frequency and amplifies the electromagnetic cancellation field.

12. The system of claim 8, wherein the laser includes a linear lens that can be decoupled without altering a fixture that houses both the LED and the laser, and wherein the controller applies a Schuman resonance frequency to the laser.

13. The system of claim 8, wherein the laser is part of an assembly that slides on rails for positioning above plants.

14. The system of claim 8, wherein the LED frequency is adjusted in a band corresponding to a color red.

15. A non-transitory, computer-readable medium containing instructions for growing plants, the instructions causing a controller to perform stages comprising:

setting a light frequency of a laser, the light frequency being within a range of 600 nanometers ("nm") to 700 nm;

controlling an intensity of a scalar energy source that is positioned within six inches of a plant;

adjusting a wavelength of a light-emitting diode ("LED") within a spectrum of 660 nm to 700 nm to cause cell elongation and increase osmosis; and applying a phytochrome effect by switching the wavelength of the LED to a range of 710 nm to 750 nm, wherein the phytochrome effect is automatically applied for between 2 and 6 minutes during a flowering phase of the plant.

16. The non-transitory, computer-readable medium of claim 15, wherein the scalar energy source is a scalar wave guide for placement at a base of a plant, the first scalar wave guide having an array of magnets, the array including first and second magnets organized such that opposing poles of the first and second magnets are adjacent to one another, wherein the controller selectively powers the array of magnets.

17. The non-transitory, computer-readable medium of claim 16, the stages further comprising:

monitoring a resonance frequency that is provided by a feedback loop, wherein the feedback loop is created using a grounding pin; and based on the monitoring, amplifying a Shuman frequency for the resonance frequency, wherein the amplification is achieved using the scalar wave guide.

18. The non-transitory, computer-readable medium of claim 16, wherein the scalar wave guide produces an electromagnetic cancelation field at a Shuman resonance frequency and amplifies the electromagnetic cancellation field.

19. The non-transitory, computer-readable medium of claim 15, wherein the laser includes a linear lens that can be decoupled without altering a fixture that houses both the LED and the laser.

20. The non-transitory, computer-readable medium of claim 15, wherein the laser is part of an assembly that slides on rails for positioning above plants.

* * * * *